United States Patent
Sun (10) Patent No.: US 7,576,803 B2
(45) Date of Patent: Aug. 18, 2009

(54) PROCESSING CIRCUIT FOR PROCESSING HORIZONTAL AND VERTICAL SYNCHRONIZATION SIGNALS

(75) Inventor: Hao Sun, Taipei Hsien (TW)

(73) Assignee: Aten International Co., Ltd., Taipei Hsien (TW)

( * ) Notice: Subject to any disclaimer, the term of this patent is extended or adjusted under 35 U.S.C. 154(b) by 855 days.

(21) Appl. No.: 11/100,414

(22) Filed: Apr. 7, 2005

(65) Prior Publication Data

US 2006/0227244 A1 Oct. 12, 2006

(51) Int. Cl.
*H04N 5/08* (2006.01)
(52) U.S. Cl. .................................... 348/554
(58) Field of Classification Search ............. 348/554, 348/530, 500, 525; 375/354, 362, 364
See application file for complete search history.

(56) References Cited

U.S. PATENT DOCUMENTS 4,894,719 A 1/1990 Moon et al.
5,091,774 A * 2/1992 Lovely et al. ............... 348/502
5,097,334 A * 3/1992 Shin .......................... 348/530
6,064,443 A * 5/2000 Lee ........................... 348/530

FOREIGN PATENT DOCUMENTS

JP 4-013375 1/1992

\* cited by examiner

*Primary Examiner*—Paulos M Natnael
(74) *Attorney, Agent, or Firm*—Rabin & Berdo, P.C.

(57) ABSTRACT

A processing circuit for simplifying a plurality of types of synchronization signals into a single type of signal is described. The processing circuit has a first polarity converter, a second polarity converter, an extraction circuit, a removal circuit, a detection circuit, and a selection circuit. The extraction circuit extracts a vertical synchronization composition from an inputted synchronization signal on a first line. When an inputted vertical synchronization signal exists on a second line, the selection circuit outputs the inputted vertical synchronization signal, and when the inputted vertical synchronization signal doesn't exist on the second line, the selection circuit outputs the vertical synchronization composition extracted from the inputted synchronization signal.

26 Claims, 6 Drawing Sheets

PROCESSING CIRCUIT FOR PROCESSING HORIZONTAL AND VERTICAL SYNCHRONIZATION SIGNALS

BACKGROUND

1. Field of Invention

The present invention relates to a video signal processing circuit. More particularly, the present invention relates to a processing circuit for processing horizontal and vertical synchronization signals.

2. Description of Related Art

Figure 2:
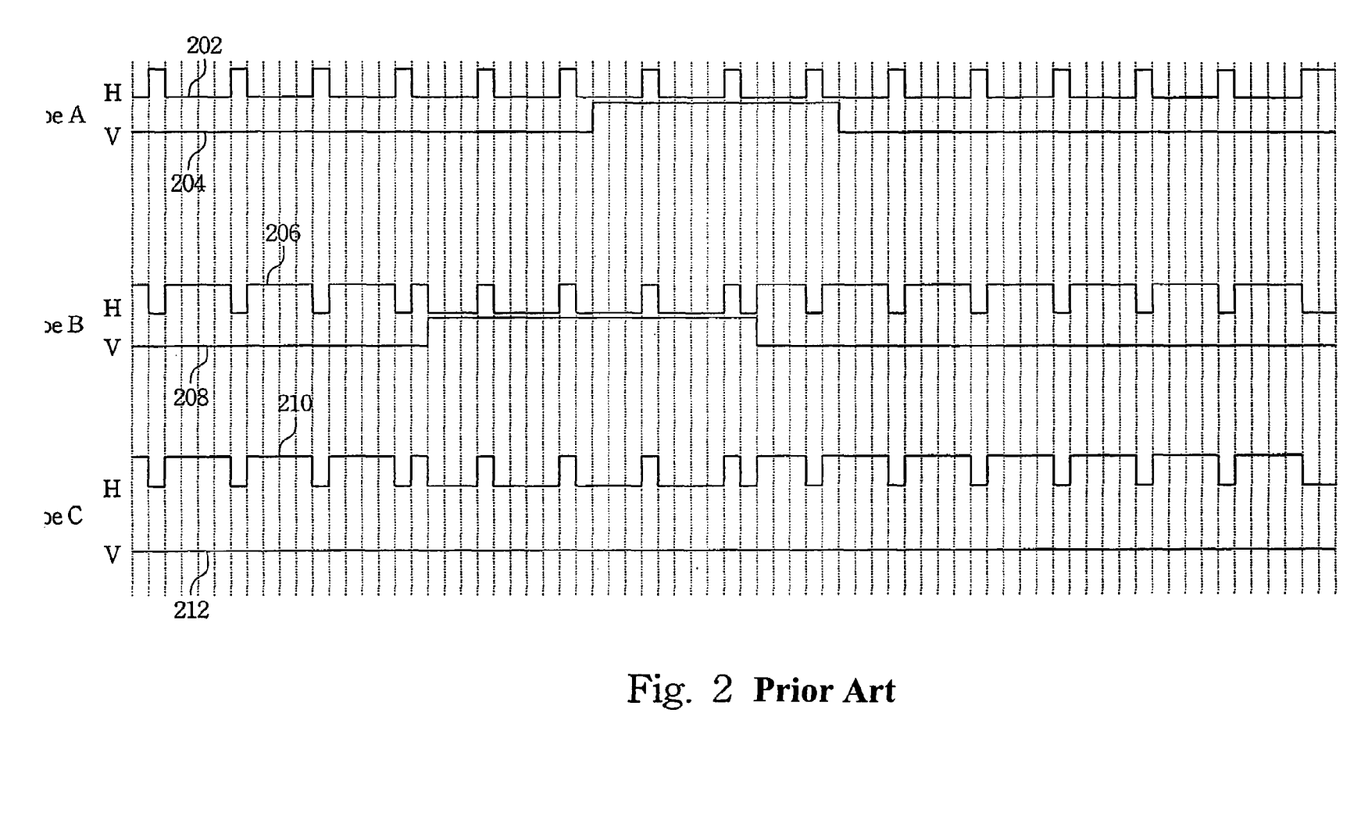
FIG. 2 shows examples of different types of horizontal and vertical synchronization signals.

There are various types of horizontal and vertical synchronization signals in the VGA Spec. They are designed to meet requirements of different display systems. The horizontal and vertical synchronization signals can be mutually independent, or combined in a single synchronization signal. FIG. 2 shows examples of different types of horizontal and vertical synchronization signals. Regarding type A, the horizontal synchronization signal 202 is independent of the vertical synchronization signal 204. Regarding type B, the horizontal synchronization signal 206 is combined with the vertical synchronization signal 208, but the vertical synchronization signal 208 still exists. Regarding type C, the horizontal synchronization signal 210 is combined with the vertical synchronization signal 212, and the vertical synchronization signal 212 doesn't exist on a vertical synchronization signal input line.

Video signals from different computers are received and transferred in a keyboard-video-mouse (KVM) system. Conventionally, a specific KVM system is designed for specific types of horizontal and vertical synchronization signals. It is inconvenient and inefficient for different KVM systems to meet different requirements.

SUMMARY

It is therefore an objective of the present invention to provide a processing circuit, wherein the processing circuit is capable of receiving various types of horizontal and vertical synchronization signals and converting them into a single type of horizontal and vertical synchronization signals.

It is another objective of the present invention to provide a processing circuit, where the processing circuit can extract a vertical synchronization signal from a combined synchronization signal when the vertical synchronization signal is embedded in the combined synchronization signal.

It is still another objective of the present invention to provide a processing circuit, where the processing circuit can select a vertical synchronization signal from a vertical synchronization composition of a combined synchronization signal and an input vertical synchronization signal.

In accordance with the foregoing and other objectives of the present invention, a processing circuit used to simplify a plurality of types of input signal to a single type of signal is described. The processing circuit includes a first polarity converter, a second polarity converter, an extraction circuit, a removal circuit, a detection circuit, and a selection circuit.

The first polarity converter receives a first synchronization signal, reverses polarity of the first synchronization signal, and outputs a second synchronization signal. The extraction circuit extracts a third vertical synchronization signal from the second synchronization signal. The removal circuit removes the combined third vertical synchronization signal from the second synchronization signal. When a first vertical synchronization signal exists, the second polarity converter receives the first vertical synchronization signal, reverses polarity of the first vertical synchronization signal, and outputs a second vertical synchronization signal.

The detection circuit detects whether there is the second vertical synchronization signal outputted from the second polarity converter outputs. The selection circuit is responsive to the detection circuit and the extraction circuit. When the second vertical synchronization signal exists, the selection circuit outputs the second vertical synchronization signal, and when the second vertical synchronization signal doesn't exist, the selection circuit outputs the third vertical synchronization signal.

The invention has at least the following advantages, and one embodiment can present one or more of the advantages. The processing circuit is capable of receiving various types of horizontal and vertical synchronization signals and converting them into a single type of horizontal and vertical synchronization signals. The processing circuit can extract a vertical synchronization signal from a combined synchronization signal when no vertical synchronization signal exists. The processing circuit can select a vertical synchronization signal from a vertical synchronization composition of a combined synchronization signal and an input vertical synchronization signal.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
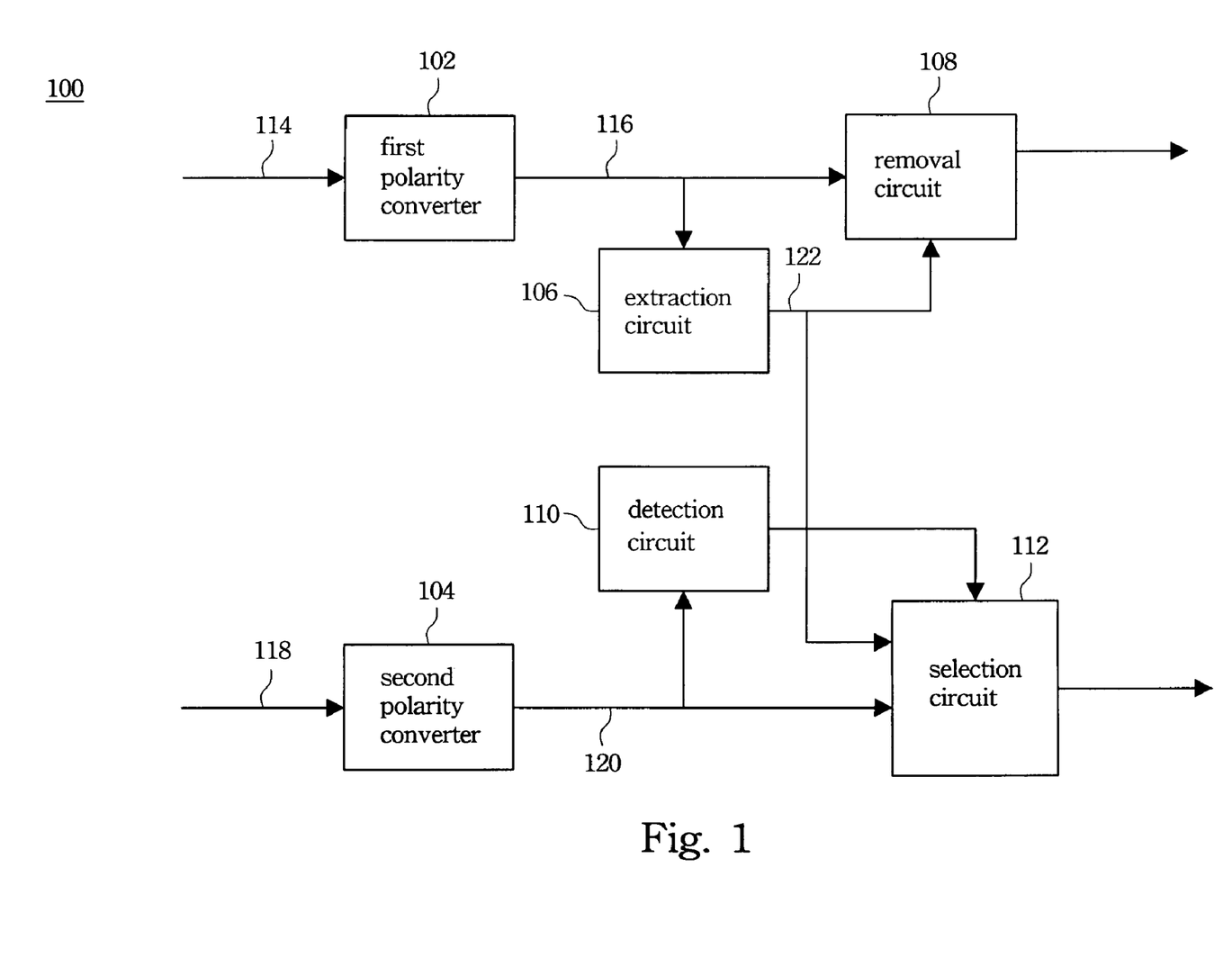
FIG. 1 is a block diagram illustrating one embodiment of the processing circuit according to the invention.

FIG. 1 is a block diagram illustrating one embodiment of the processing circuit according to the invention. With reference to FIG. 1, the processing circuit is used to receive various types of horizontal and vertical synchronization signals, which may be separate or combined together, and then converts these signals into a single type of horizontal and vertical synchronization signals, which are independent of each other.

The processing circuit 100 includes a first polarity converter 102, a second polarity converter 104, an extraction circuit 106, a removal circuit 108, a detection circuit 110, and a selection circuit 112.

The first polarity converter 102 receives a first synchronization signal 114, reverses the polarity of the first synchronization signal 114, and outputs a second synchronization signal 116. Depending on the type of the first synchronization signal 114, the first synchronization signal 114 can be a synchronization signal having both vertical and horizontal synchronization signal compositions. Alternatively, the first synchronization signal 114 can be a synchronization signal without vertical synchronization signal composition. On the other hand, when a first vertical synchronization signal 118 exists, the second polarity converter 104 receives the first vertical synchronization signal 118, reverses the polarity of the first vertical synchronization signal 118, and outputs a second vertical synchronization signal 120.

The extraction circuit 106 extracts a third vertical synchronization signal 122 from the second synchronization signal 116 if the horizontal and the vertical synchronization compositions are combined in the second synchronization signal 116. The removal circuit 108 removes the third vertical synchronization signal 122 from the second synchronization signal 116 using the third vertical synchronization signal 122 extracted by the extraction circuit 106.

The detection circuit 110 detects whether there is a second vertical synchronization signal 120 outputted from the second polarity converter 104. The second vertical synchronization signal 120 has the reverse polarity with respect to the first vertical synchronization signal 118. The selection circuit 112 responds to the detection circuit 110 or the extraction circuit 106. When the second vertical synchronization signal 120 exists between the second polarity converter 104 and the selection circuit 112, the selection circuit 112 outputs the second vertical synchronization signal 120. When the second vertical synchronization signal 120 doesn't exist between the second polarity converter 104 and the selection circuit 112, the selection circuit 112 outputs the third vertical synchronization signal 122 extracted by the extraction circuit 106. That is, based on the outputting of the second polarity converter 104, the selection circuit 112 outputs the second vertical synchronization signal 120 or the third vertical synchronization signal 122.

As mentioned before, there are many kinds of horizontal and vertical synchronization signals in the field of video processing. FIG. 2 shows examples of different types of horizontal and vertical synchronization signals. In type A, the horizontal synchronization signal 202 is independent of the vertical synchronization signal 204. In B, the horizontal synchronization signal 206 is related to the vertical synchronization signal 208, but the vertical synchronization signal 208 still exists. In type C, the horizontal synchronization signal 210 is combined with the vertical synchronization signal, and the output of the vertical synchronization signal 212 is logically high or low. One objective of the present invention is to process different types of horizontal and vertical synchronization signals (such as type A, B, and C) and generate a single type (type A) of horizontal and vertical synchronization signals.

Figure 3:
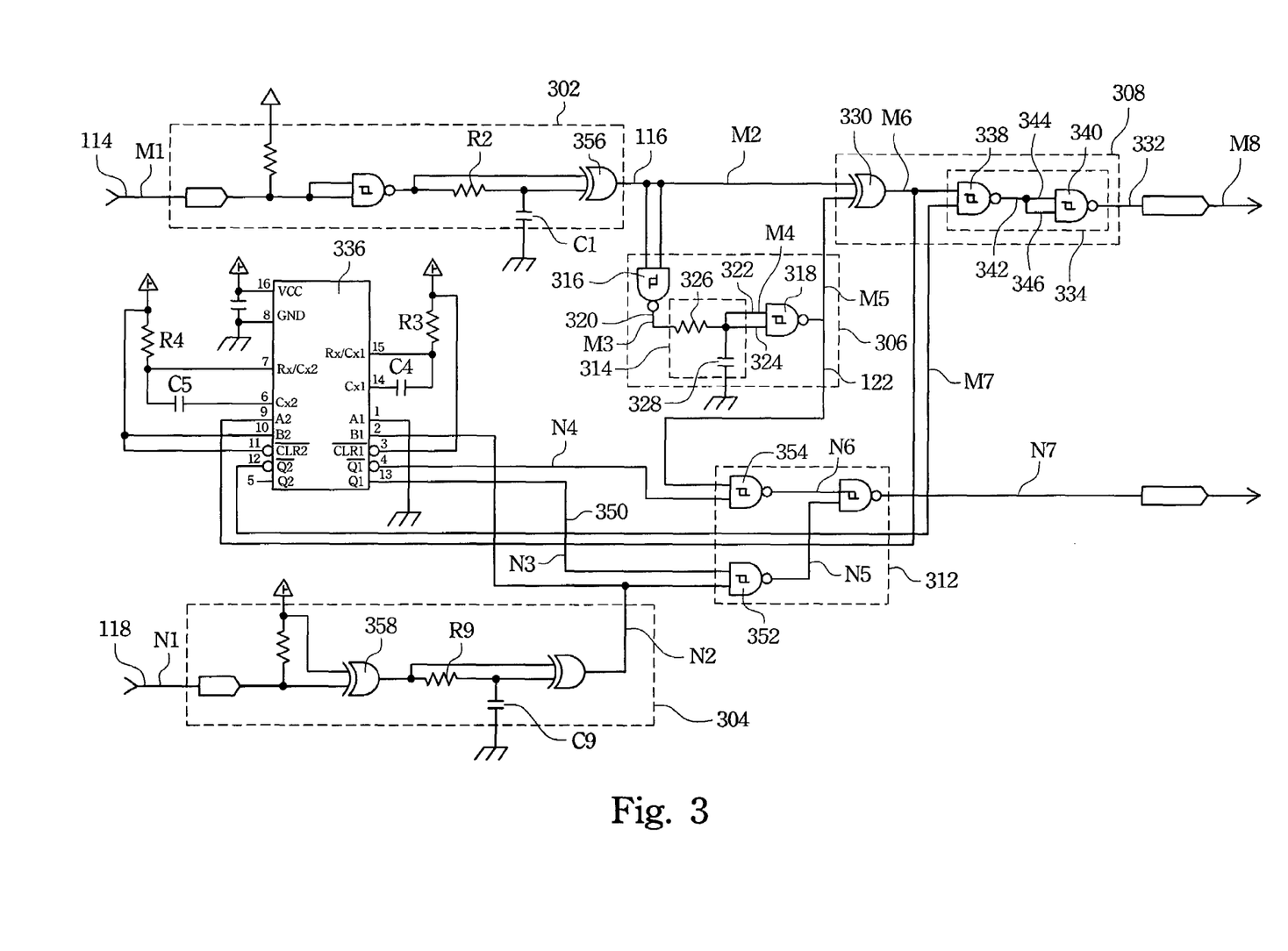
FIG. 3 is a detailed circuit diagram according to one embodiment of the invention.

FIG. 3 is a detailed circuit diagram according to one embodiment of the invention. With reference to FIG. 3, a first polarity converter 302 is an example of the first polarity converter 102 of FIG. 1. A second polarity converter 304 is an example of the second polarity converter 104 of FIG. 1. An extraction circuit 306 is an example of the extraction circuit 106 of FIG. 1. A removal circuit 308 is an example of the removal circuit 108 of FIG. 1. A selection circuit 312 is an example of the selection circuit 112 of FIG. 1.

The extraction circuit 306 can be a low-pass filter circuit 314, including a resistor 326 and a capacitor 328, to extract a vertical synchronization composition, such as a third vertical synchronization signal 122, from the second synchronization signal 116.

The frequency of a horizontal synchronization signal is usually higher than that of a vertical synchronization signal. Therefore, the third vertical synchronization signal 122, which has lower frequency, is extracted from the second synchronization signal 116, which has both higher and lower frequency, by the low-pass filter circuit 314.

The extraction circuit 306 includes a first NAND Schmitt trigger 316 and a second NAND Schmitt trigger 318, such as a 74HC132 IC. The output 320 of the first NAND Schmitt trigger 316 is connected to two inputs (322, 324) of the second NAND Schmitt trigger 318 through resist or the low-pass filter circuit 314. One end of the capacitor 328 is grounded. Data sheet of 74HC132 IC (produced by Philips Semiconductors) is incorporated herein by reference.

The removal circuit 308 has an XOR gate (exclusive OR gate) 330. The XOR gate 330 receives the second synchronization signal 116 and the third vertical synchronization signal 122 and outputs an output horizontal synchronization signal 332, which has positive polarity.

The removal circuit 308 can further include a glitch removal circuit 334. The glitch removal circuit 334 removes glitches from the output horizontal synchronization signal 332 before the output horizontal synchronization signal 332 is outputted.

The glitch removal circuit 308 uses a monostable multivibrator 336 (such as 74HC123), a first NAND Schmitt trigger 338, and a second Schmitt trigger 340. An output 342 of the first NAND Schmitt trigger 338 is connected to two inputs (344, 346) of the second NAND Schmitt trigger 340. Data sheet of 74HC123 IC (produced by Philips Semiconductors) is incorporated herein by reference.

Figure 4:
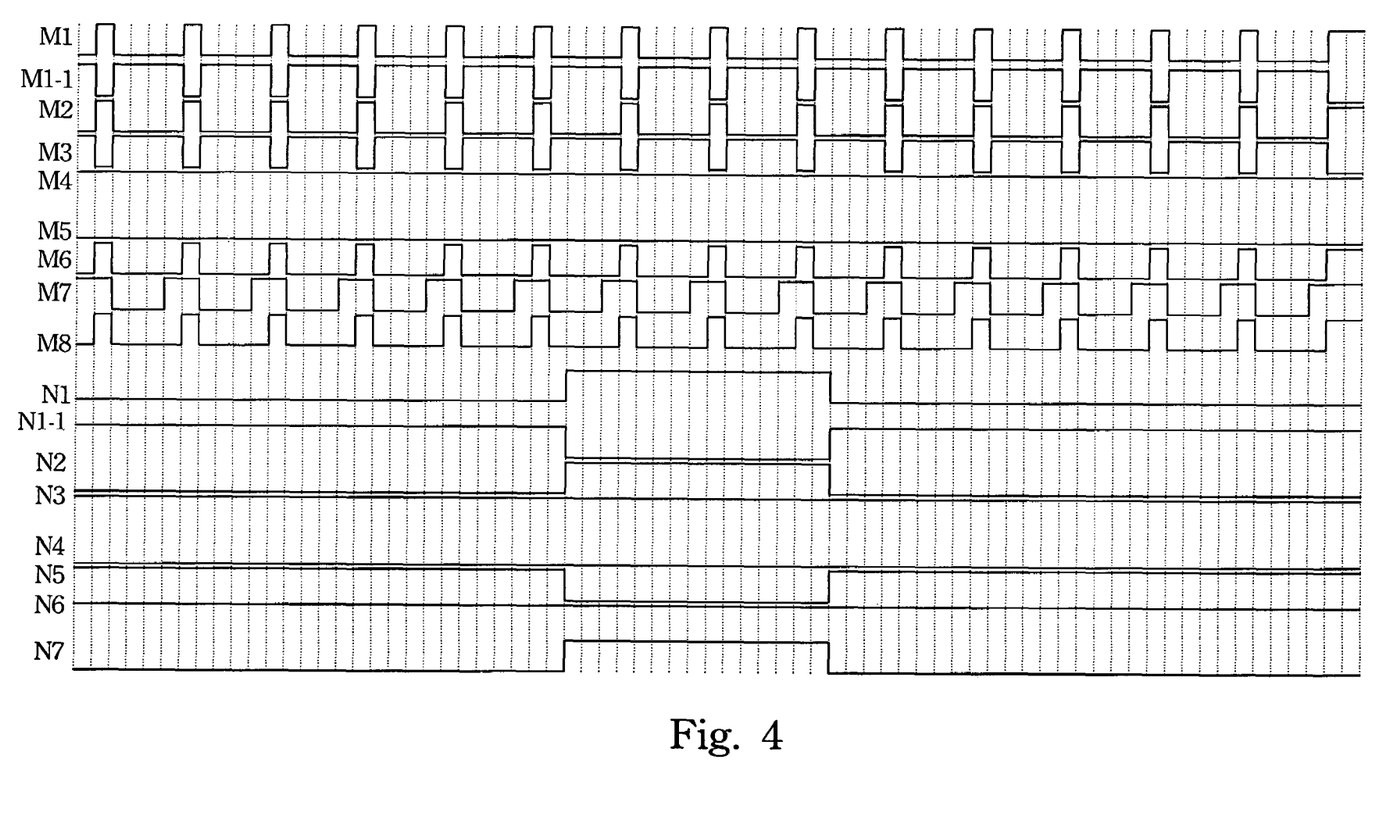
FIG. 4 is a waveform diagram illustrating the operation of the processing circuit of FIG. 3 when the inputted horizontal and vertical synchronization signals fall into type A.
Figure 5:
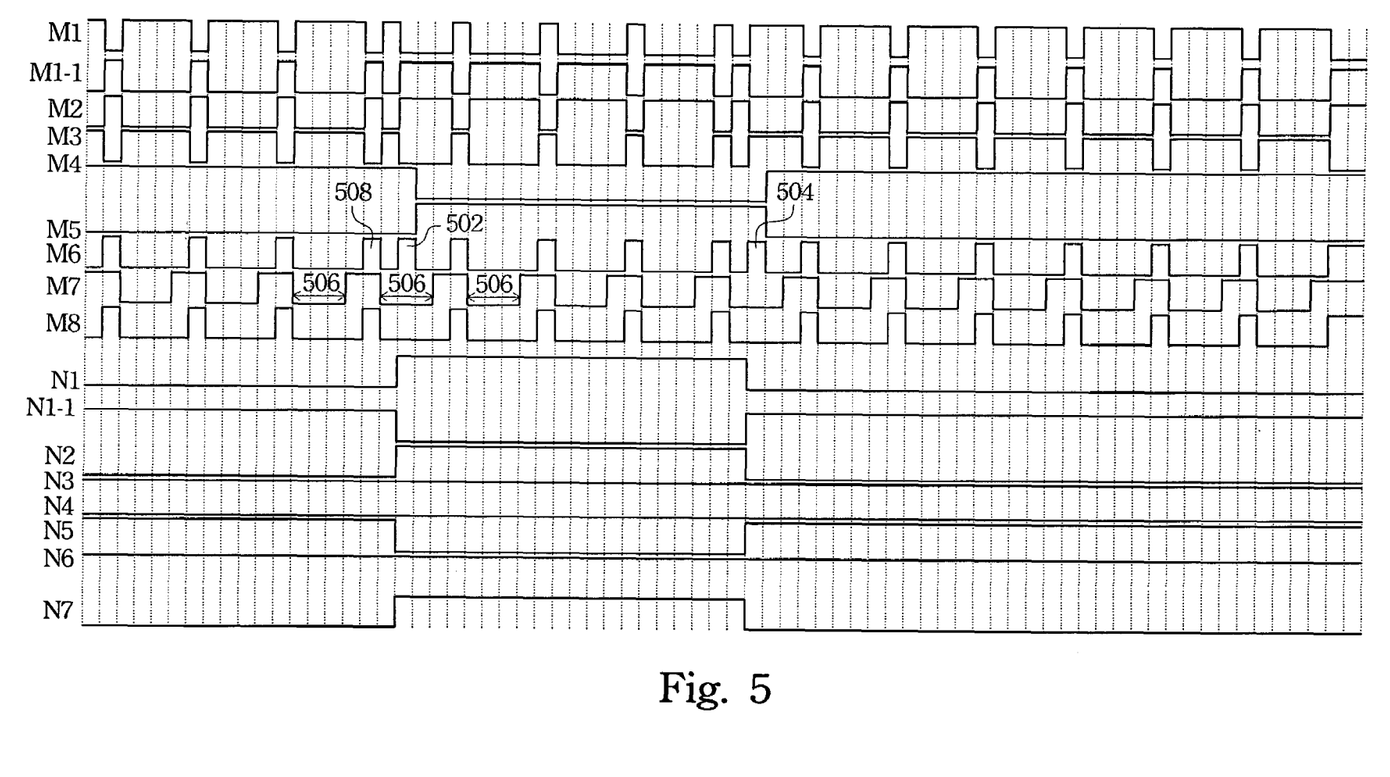
FIG. 5 is a waveform diagram illustrating the operation of the processing circuit of FIG. 3 when the inputted horizontal and vertical synchronization signals fall into type B.
Figure 6:
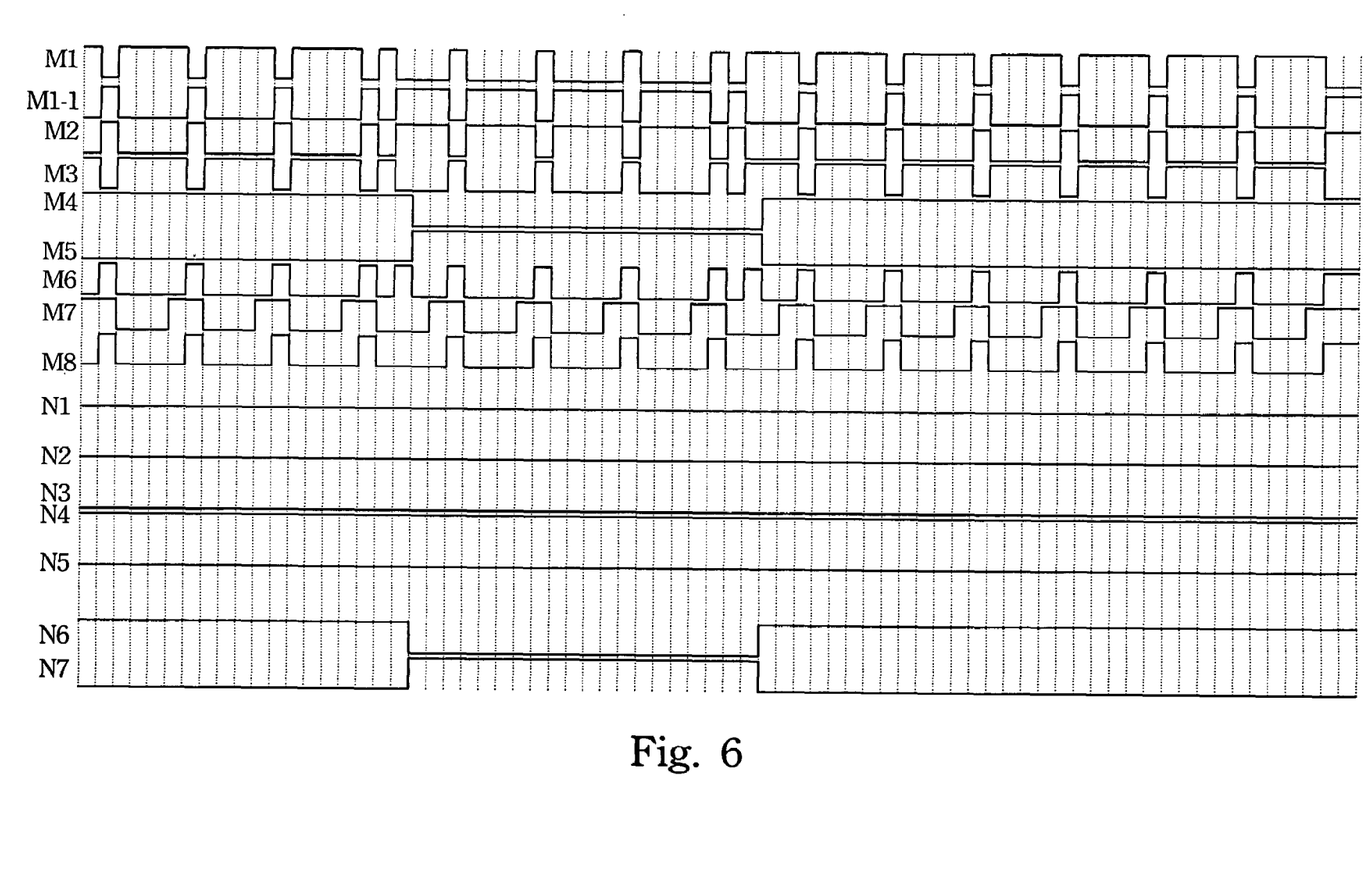
FIG. 6 is a waveform diagram illustrating the operation of the processing circuit of FIG. 3 when the inputted horizontal and vertical synchronization signals fall into type C.

FIG. 4 is a waveform diagram illustrating the operation of the processing circuit of FIG. 3 when the inputted horizontal and vertical synchronization signals fall into type A shown in FIG. 2. FIG. 5 is a waveform diagram illustrating the operation of the processing circuit of FIG. 3 when the inputted horizontal and vertical synchronization signals fall into type B shown in FIG. 2. FIG. 6 is a waveform diagram illustrating the operation of the processing circuit of FIG. 3 when the inputted horizontal and vertical synchronization signals fall into type C shown in FIG. 2.

Waveforms M1, M2, M3, M4, M5, M6, M7, M8, N1, N2, N3, N4, N5, N6, N7, and N8 of FIG. 4, FIG. 5, or FIG. 6 correspond respectively to the waveforms on nodes M1, M2, M3, M4, M5, M6, M7, M8, N1, N2, N3, N4, N5, N6, N7, and N8 of FIG. 3. With reference to FIG. 3 and FIG. 4, the waveform M1 is the first synchronization signal 114 and the waveform N1 is the first vertical synchronization signal 118. When the waveform on the node M1 is negative in polarity (such as the waveform M1-1), the first polarity converter 302 inverts the waveform M1-1 and generates a waveform of positive polarity (the waveform M2). When the waveform on the node M1 is positive in polarity (such as the waveform M1), the first polarity converter 302 let the waveform M1 pass and the waveform M2 (on the node M2) is generated. Therefore, the waveform M2 is always positive in polarity. The waveform M8 is also positive in polarity.

The output (the waveform M5) of the extraction circuit 306 is always at a low voltage level, so the output waveform (waveform M6) of the XOR gate 330 is the same as the waveform M2. The waveform M8 is the same as the waveform M6 since the waveform M7 has no effect on the waveform M8. Thus, the original waveform M1 is converted into a positive polarity waveform M8 and then outputted.

Likewise, when the waveform on the node N1 is negative in polarity (such as the waveform N1-1), the second polarity converter 304 inverts the waveform N1-1 and generates a waveform of positive polarity (the waveform N2). When the waveform on the node N1 is positive in polarity (such as the waveform N1), the second polarity converter 304 lets the waveform N1 pass and the waveform N2 (on the node N2) is generated. Therefore, the waveform N2 is always positive in polarity. In this embodiment, the RC delay (R2, C1) in the first polarity converter 302 is about 1 mini second. The RC delay (R9, C9) in the second polarity converter 304 is also about 1 millisecond. There are many possibilities for realizing the first and the second polarity converters. For example, the XOR gate 356 can be replaced by a NAND gate, and the XOR gate 358 can also be replaced by a NAND gate.

The waveform N2 is inputted to the B1 pin (pin number 2) of the monostable multivibrator 336. When the first vertical synchronization signal 118 (the waveform N1) exists, the rising edge of the first vertical synchronization signal 118 triggers the monostable multivibrator 336 to generate a detection result signal 350 (the waveform N3) lasting for a time period longer than a common period of the first vertical synchronization signal 118 (the waveform N1).

In this embodiment, the combination of (R3, C4) is used to adjust the time period, which is about 20 ms and is longer than two times the period of the first vertical synchronization signal 118 (the waveform N1). When no rising edge of the first vertical synchronization signal 118 triggers the monostable multivibrator 336, it is determined that the first vertical synchronization signal 118 does not exist. When a rising edge of the first vertical synchronization signal 118 exists, it triggers the monostable multivibrator 336, and therefore, it is determined that the first vertical synchronization signal 118 does exist.

In this case (the first vertical synchronization signal 118 exists), the detection result signal 350 (the waveform N3) is always at a high voltage level since the waveform N2 has triggered the monostable multivirator 336 at the beginning. Therefore, the NAND Schmitt trigger 352 lets the waveform N2 pass and the NAND Schmitt trigger 354 blocks the waveform M5 since the waveform N4 is always at a low voltage level. In other words, the selection circuit 312 selects the waveform N2. A waveform N7 that is the same as the waveform N2 is outputted.

With reference to FIG. 3 and FIG. 5, the first synchronization signal 114 (the waveform M1) is combined with the first vertical synchronization signal 118 (the waveform N1). The third vertical synchronization signal 122 (the waveform M5) is extracted from the second synchronization signal 116 (the waveform M2). Because of the RC circuit (the resistor 326 and the capacitor 328), the third vertical synchronization signal 316 (the waveform M5) is slightly delayed. The RC delay is about 6 micro-seconds in this embodiment. However, the first vertical synchronization signal 118 (the waveform N1) still exists. So, the selection circuit 312 still selects the waveform N2. The waveform N7 that is the same as the waveform N2 is outputted. The waveform M5 is blocked. Because the waveform M5 is slightly delayed, outputting the waveform N7 is therefore better.

To remove the third vertical synchronization signal 122 (the waveform M5) from the second synchronization signal 116 (the waveform M2), the XOR gate 330 is used. Through an XOR operation, the vertical synchronization signal component is removed and the waveform M6 is generated. However, glitches 502 and 504 are generated because the waveform M5 is slightly delayed. To remove the glitches 502 and 504, the waveform M6 is inputted into the A2 pin (pin number 9) of the monostable multivibrator 336 and the monostable multivibrator 336 generates a signal (the waveform M7) with a period of low voltage level (period 506) following each negative edge of the output of the XOR gate (the waveform M6). The signal (the waveform M7) with the period of low voltage level (period 506) is inputted to one input of the first NAND Schmitt trigger 338 to suppress a glitch (such as the glitch 502) following a normal pulse (such as the normal pulse 508) of the output horizontal synchronization signal. Subsequently, the waveform M8 without glitches is outputted. The period 506 is determined by (R4, C5), which is about 6 microseconds in this embodiment.

With reference to FIG. 3 and FIG. 6, the waveform M1 is the same as the waveform M1 of FIG. 5. Therefore, the operations of the waveform M1 of FIG. 6 are the same as those of the waveform M1 of FIG. 5. Thus, the waveform M8 (the output horizontal synchronization signal) without glitches is outputted. However, no first vertical synchronization signal exists because there is no rising or falling edge on the waveform N1. The monostable multivibrator 336 cannot detect any first vertical synchronization signal, so the detection result signal 350 (the waveform N3) is always at a low level. The selection circuit 312 then selects the third vertical synchronization signal 316 (the waveform M5) as an output vertical synchronization signal (the waveform N7).

In some of the claims, the second synchronization signal is renamed as a first synchronization signal, the second vertical synchronization signal is renamed as a first vertical synchronization signal, and the third vertical synchronization signal is renamed as a second vertical synchronization signal for convenience of description. However, the behaviors of the processing circuit are the same in this embodiment.

The monostable multivibrator 336 is, for example, a 74HC123 chip. The NAND Schmitt triggers mentioned in this invention are, for example, a 74HC132 chip.

The invention has at least the following advantages, and one embodiment can present one or more of the advantages. The processing circuit is capable of receiving various types of horizontal and vertical synchronization signals and converts them into a single type of horizontal and vertical synchronization signals. The processing circuit can extract a vertical synchronization signal from a synchronization signal having combined vertical and horizontal synchronization compositions when no independent vertical synchronization signal exists. The processing circuit can select a vertical synchronization signal from a vertical synchronization composition of a combined synchronization signal and an input vertical synchronization signal.

Although the present invention has been described in considerable detail with reference to certain preferred embodiments thereof, other embodiments are possible. Therefore, their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A processing circuit, used to simplify a plurality of types of input signal to a single type of signal, the processing circuit comprising:
   a first polarity converter for receiving a first synchronization signal,
   reversing polarity of the first synchronization signal, and outputting a second synchronization signal, wherein the first synchronization signal is selected from the group consisting of a horizontal synchronization signal without vertical synchronization signal composition, and a horizontal synchronization signal with vertical synchronization signal composition combined therein;
   a second polarity converter, wherein when a first vertical synchronization signal exists, the second polarity converter reverses polarity of the first vertical synchronization signal, and outputs a second vertical synchronization signal;
   an extraction circuit for extracting the vertical synchronization signal composition from the second synchronization signal;
   a removal circuit for removing the vertical synchronization signal composition from the second synchronization signal;
   a detection circuit for detecting whether there is the second vertical synchronization signal outputted from the second polarity converter; and
   a selection circuit, responsive to the detection circuit, wherein when the second vertical synchronization signal exists, the selection circuit outputs the second vertical synchronization signal, and when the second vertical synchronization signal doesn't exist, the selection circuit outputs the vertical synchronization signal composition.

2. The processing circuit of claim 1, wherein the extraction circuit comprises a low-pass filter circuit to extract the vertical synchronization signal composition from the second synchronization signal.

3. The processing circuit of claim 1, wherein the extraction circuit comprises a first NAND Schmitt trigger and a second NAND Schmitt trigger, the output of the first NAND Schmitt trigger is connected to one input of the second NAND Schmitt trigger through a resistor, and the other input of the second NAND Schmitt trigger is grounded through a capacitor.

4. The processing circuit of claim 1, wherein the removal circuit comprises an XOR gate receiving the second synchronization signal and the vertical synchronization signal composition and outputting an output horizontal synchronization signal.

5. The processing circuit of claim 4, wherein the removal circuit further comprises a glitch removal circuit for removing glitches from the output horizontal synchronization signal before the output horizontal synchronization signal is outputted.

6. The processing circuit of claim 5, wherein (i) the glitch removal circuit comprises a monostable multivibrator, a first NAND Schmitt trigger, and a second Schmitt trigger, (ii) an output of the first NAND Schmitt trigger is connected to two inputs of the second NAND Schmitt trigger, (iii) the monostable multivibrator generates a signal with a period of low voltage level following each negative edge of the output of the XOR gate, and (iv) the signal with the period of low voltage level is inputted to one input of the first NAND Schmitt trigger to suppress a glitch following a normal pulse of the output horizontal synchronization signal.

7. The processing circuit of claim 1, wherein (i) the detection circuit comprises a monostable multivibrator, and (ii) when the first vertical synchronization signal exists, the rising edge of the first vertical synchronization signal triggers the monostable multivibrator to generate a detection result signal lasting a time period longer than a common period of the first vertical synchronization signal.

8. The processing circuit of claim 7, wherein the selection circuit based on the detection result signal selects to output the vertical synchronization signal composition or the second vertical synchronization signal.

9. A processing circuit, used to simplify a plurality of types of input signal to a single type of signal, the processing circuit comprising:
   a detection circuit for detecting whether a first vertical synchronization signal exists;
   an extraction circuit for receiving a first synchronization signal, wherein the first synchronization signal is selected from a group of a horizontal synchronization signal without vertical synchronization signal composition, and a horizontal synchronization signal with vertical synchronization signal composition combined therein, and the extraction circuit is for extracting the vertical synchronization signal composition from the first synchronization signal;
   a removal circuit for removing the vertical synchronization signal composition from the first synchronization signal; and
   a selection circuit, responsive to the detection circuit, wherein when the first vertical synchronization signal exists, the selection circuit outputs the first vertical synchronization signal, and when the first vertical synchronization signal doesn't exist, the selection circuit outputs the vertical synchronization signal composition.

10. The processing circuit of claim 9, further comprising a first polarity converter for reversing polarity of the first synchronization signal before the first synchronization signal is received by the extraction circuit.

11. The processing circuit of claim 9, further comprising a second polarity converter, wherein when the first vertical synchronization signal exists, the second polarity converter reverses polarity of the first vertical synchronization signal before the first vertical synchronization signal is received by the detection circuit.

12. The processing circuit of claim 9, wherein the extraction circuit comprises a low-pass filter circuit to extract the vertical synchronization signal composition from the first synchronization signal.

13. The processing circuit of claim 9, wherein the extraction circuit comprises a first NAND Schmitt trigger and a second NAND Schmitt trigger, the output of the first NAND Schmitt is connected to two inputs of the second NAND Schmitt trigger through a resistor, and the two inputs of the second NAND Schmitt trigger are grounded through a capacitor.

14. The processing circuit of claim 9, wherein the removal circuit comprises an XOR gate receiving the first synchronization signal and the vertical synchronization signal composition and outputting an output horizontal synchronization signal.

15. The processing circuit of claim 14, wherein the removal circuit further comprises a glitch removal circuit for removing glitches from the output horizontal synchronization signal before the output horizontal synchronization signal is outputted.

16. The processing circuit of claim 15, wherein (i) the glitch removal circuit comprises a monostable multivibrator, a first NAND Schmitt trigger, and a second Schmitt trigger, (ii) an output of the first NAND Schmitt trigger is connected to two inputs of the second NAND Schmitt trigger, (iii) the monostable multivibrator generates a signal with a period of low voltage level following each negative edge of the output of the XOR gate, and (iv) the signal with the period of low voltage level is inputted to one input of the first NAND Schmitt trigger to suppress a glitch following a normal pulse of the output horizontal synchronization signal.

17. The processing circuit of claim 9, wherein (i) the detection circuit comprises a monostable multivibrator, and (ii) when the first vertical synchronization signal exists, the rising edge of the first vertical synchronization signal triggers the monostable multivibrator to generate a detection result signal lasting for a time period longer than a common period of the first vertical synchronization signal.

18. The processing circuit of claim 17, wherein the selection circuit receives the detection result signal and selects an output vertical synchronization signal from the vertical synchronization signal composition and the first vertical synchronization signal.

19. A processing circuit, used to simplify a plurality of types of input signal to a single type of signal, the processing circuit comprising:
  a first polarity converter for receiving a first synchronization signal, reversing polarity of the first synchronization signal, and outputting a second synchronization signal, wherein the first synchronization signal is selected from a group of a horizontal synchronization signal without vertical synchronization signal composition, and a horizontal synchronization signal with vertical synchronization signal composition combined therein;
  a second polarity converter, wherein when a first vertical synchronization signal is received, the second polarity converter reverses polarity of the first vertical synchronization signal and outputs a second vertical synchronization signal;
  an extraction circuit for extracting the vertical synchronization signal composition from the second synchronization signal;
  a removal circuit for removing the vertical synchronization signal composition from the second synchronization signal; and
  a selection circuit for outputting the second vertical synchronization signal or the vertical synchronization signal composition.

20. The processing circuit of claim 19, further comprises a detection circuit for detecting whether there is the second vertical synchronization signal, wherein when the second vertical synchronization signal is detected, the selection circuit, responsive to the detection circuit, outputs the second vertical synchronization signal, and when the second vertical synchronization signal is not detected, the selection circuit outputs the vertical synchronization signal composition.

21. A method for simplifying a plurality of types of input signal to a single type of signal, the method comprising:
  detecting whether a first vertical synchronization signal exists;
  receiving a first synchronization signal, selected from a group of a horizontal synchronization signal without vertical synchronization signal composition and a horizontal synchronization signal with vertical synchronization signal composition, and extracting in an extraction circuit the vertical synchronization signal composition from the first synchronization signal;
  removing in a removal circuit the vertical synchronization signal composition from the first synchronization signal;
  when the first vertical synchronization signal exists, outputting the first vertical synchronization signal; and
  when the first vertical synchronization signal doesn't exist, outputting the vertical synchronization signal composition.

22. The method of claim 21, further comprising:
  reversing polarity of the first synchronization signal before performing the step of extracting.

23. The method of claim 21, further comprising:
  when the first vertical synchronization signal exists, reversing polarity of the first vertical synchronization signal before performing the step of detecting.

24. The method of clam 21, wherein the step of extracting comprises:
  extracting the vertical synchronization signal composition from the first synchronization signal by a low-pass filter circuit.

25. The method of claim 21, wherein the step of removing comprises:
  using an XOR gate to receive the first synchronization signal and the vertical synchronization signal composition and to output an output horizontal synchronization signal.

26. The method of claim 25, wherein the step of removing comprises:
  removing glitches from the output horizontal synchronization signal before the output horizontal synchronization signal is outputted.

* * * * *